US011365459B2

(12) United States Patent
Tanaka et al.

(10) Patent No.: US 11,365,459 B2
(45) Date of Patent: Jun. 21, 2022

(54) HIGH STRENGTH COLD ROLLED STEEL SHEET AND METHOD OF PRODUCING SAME (71) Applicant: JFE Steel Corporation, Tokyo (JP)

(72) Inventors: Takaaki Tanaka, Tokyo (JP); Yuki Toji, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 186 days.

(21) Appl. No.: 16/499,592

(22) PCT Filed: Apr. 2, 2018

(86) PCT No.: PCT/JP2018/014075
§ 371 (c)(1),
(2) Date: Sep. 30, 2019

(87) PCT Pub. No.: WO2018/186335
PCT Pub. Date: Oct. 11, 2018

(65) Prior Publication Data
US 2020/0040421 A1  Feb. 6, 2020

(30) Foreign Application Priority Data

Apr. 5, 2017  (JP) .............................. JP2017-075154
Feb. 2, 2018  (JP) .............................. JP2018-017145

(51) Int. Cl.
C21D 9/46 (2006.01)
B32B 15/01 (2006.01)
(Continued)

(52) U.S. Cl.
CPC .............. *C21D 9/46* (2013.01); *B32B 15/013* (2013.01); *C21D 6/001* (2013.01); *C21D 6/002* (2013.01);
(Continued)

(58) Field of Classification Search
CPC ....................................................... C21D 9/46
See application file for complete search history.

(56) References Cited

U.S. PATENT DOCUMENTS

2013/0269838 A1  10/2013  Kawano et al.
2017/0145534 A1   5/2017  Takashima et al.
(Continued)

FOREIGN PATENT DOCUMENTS

EP    3 128 023 A1    2/2017
JP    2004-292891 A   10/2004
(Continued)

OTHER PUBLICATIONS

Miyamoto, G. et al., "Crystallographic Restriction in Martensite and Bainite Transformations in Steels," *Journal of the Japan Institute of Metals and Materials*, The Japan Institute of Metals and Materials, Jul. 2015, vol. 79, No. 7, pp. 339-347, with English abstract.
(Continued)

*Primary Examiner* — Jophy S. Koshy
(74) *Attorney, Agent, or Firm* — DLA Piper LLP (US)

(57) ABSTRACT

A high strength cold rolled steel sheet has a composition which contains, in terms of mass %, more than 0.15% and not more than 0.45% of C, 0.50-2.50% of Si, 1.50-3.00% of Mn, not more than 0.050% of P, not more than 0.0100% of S, 0.010-0.100% of Al and not more than 0.0100% of N, with the remainder including Fe and unavoidable impurities, has a total content of ferrite and bainitic ferrite of 20-80%, has a retained austenite content of more than 10% and not more than 40%, has a martensite content of more than 0% and not more than 50%, and is such that the proportion of retained austenite that has an aspect ratio of not more than 0.5 is not less than 75%, and the proportion of retained austenite having an aspect ratio of not more than 0.5 that is present at Bain group boundaries is not less than 50%.

16 Claims, 1 Drawing Sheet (51) Int. Cl.
*C21D 6/00* (2006.01)
*C21D 8/02* (2006.01)
*C22C 38/00* (2006.01)
*C22C 38/02* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/38* (2006.01)

(52) U.S. Cl.
CPC ............. *C21D 6/005* (2013.01); *C21D 6/008* (2013.01); *C21D 8/0205* (2013.01); *C21D 8/0236* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2017/0204490 A1 | 7/2017 | Kawasaki et al. |
| 2018/0023155 A1 | 1/2018 | Takeda et al. |
| 2018/0057916 A1 | 3/2018 | Obata et al. |

FOREIGN PATENT DOCUMENTS

| | | |
|---|---|---|
| WO | 2012/053044 A1 | 4/2012 |
| WO | 2015/151419 A1 | 10/2015 |
| WO | 2016/021193 A1 | 2/2016 |
| WO | 2016/132680 A1 | 8/2016 |
| WO | 2016/136810 A1 | 9/2016 |

OTHER PUBLICATIONS

The Extended European Search Report dated Feb. 4, 2020, of counterpart European Application No. 18780802.7.

Office Action dated Oct. 12, 2020, of counterpart Chinese Application No. 201880020730.4, along with a Search Report in English.

Office Action dated Nov. 12, 2020, of counterpart Korean Application No. 10-2019-7028975, along with a Search Report in English.

Notice of Final Rejection dated Apr. 28, 2021, of counterpart Korean Application No. 10-2019-7028975, along with a Search Report in English.

HIGH STRENGTH COLD ROLLED STEEL SHEET AND METHOD OF PRODUCING SAME

TECHNICAL FIELD

This disclosure relates to a high strength cold rolled steel sheet and a method of manufacturing the same, more specifically, to a high strength cold rolled steel sheet having high strength with a tensile strength (TS) of 980 MPa or more that is suitable for parts of transport machinery such as automobiles, as well as a method of manufacturing the same.

BACKGROUND

Conventionally, high strength cold rolled steel sheets have been used for parts of vehicle bodies and other parts (for instance, see WO 2016/132680 and WO 2016/021193).

In recent years, there has been a demand for higher fuel efficiency of automobiles for the purpose of conservation of the global environment, and the use of high strength cold rolled steel sheets having a tensile strength of 980 MPa or more has been encouraged.

Furthermore, recently, a demand for improvement in collision safety of automobiles is increasing, and for the purpose of ensuring the safety of vehicle occupants in a collision, application of high strength cold rolled steel sheets having extremely high strength with a tensile strength of at least 1180 MPa to structural members of vehicle bodies such as vehicle frames has also been under discussion.

Steel sheets decrease in ductility with increasing strength. Since steel sheets with low ductility are likely to have cracking during press forming, to process high strength steel sheets into automotive parts, the steel sheets need to have both high strength and high ductility.

Sometimes, steel sheets are required to have excellent stretch flangeability as one index of formability. The stretch flangeability is determined to be good when, for example, the average of hole expansion ratios obtained in a predetermined hole expanding test is large.

Meanwhile, even with steel sheets exhibiting a good average of hole expansion ratios (average hole expansion ratio), when such a steel sheet is subjected to the test an increased number of times, a measurement far lower than the average is obtained once in a while. The probability of having a measurement far lower than the average as above is defined as a defect rate in the hole expanding test.

A steel sheet with a high defect rate in the hole expanding test is highly likely to be defective also in actual press forming. When a great number of parts are formed in high volume production, the defect as above is not negligible. To reduce the defect rate in press forming, a steel sheet with a low defect rate in the hole expanding test is required.

Accordingly, there is a demand for a steel sheet having not only high strength with a tensile strength of 980 MPa or more but also excellent ductility and excellent stretch flangeability and also having a low defect rate in the hole expanding test.

Conventional cold rolled steel sheets are, however, insufficient in one or some of the foregoing properties.

It could therefore be helpful to provide a high strength cold rolled steel sheet having not only a tensile strength of 980 MPa or more, but excellent ductility and excellent stretch flangeability and also having a lower defect rate in the hole expanding test, as well as a method of manufacturing the same.

SUMMARY

We found that when retained austenite in a massive form with a large aspect ratio in a steel sheet is exposed in many places on a punched edge face upon punching carried out before the hole expanding test, edge face cracking is induced, and the hole expansion ratio is greatly reduced.

We further found that when retained austenite in a needle shape with a small aspect ratio is present at a Bain group boundary, this has the effect of preventing the edge face cracking from occurring.

In addition, we found that when a steel sheet has a high volume fraction of retained austenite in a needle shape with a small aspect ratio and has the microstructure in which much of the retained austenite in a needle shape with a small aspect ratio is present at a Bain group boundary, the defect rate in a hole expanding test is remarkably low.

We further found that, by performing heat treatment (annealing step) on a steel sheet two times, particularly by controlling the heating history in the first annealing step, the microstructure of the steel sheet can be stably altered to such microstructure as above.

We thus provide the following [1] to [6]:

[1] A high strength cold rolled steel sheet having a composition including: by mass,
C in an amount of more than 0.15% but not more than 0.45%,
Si in an amount of not less than 0.50% but not more than 2.50%,
Mn in an amount of not less than 1.50% but not more than 3.00%,
P in an amount of not more than 0.050%,
S in an amount of not more than 0.0100%,
Al in an amount of not less than 0.010% but not more than 0.100%, and
N in an amount of not more than 0.0100%, with balance Fe and inevitable impurities,
wherein in its microstructure, a total area fraction of ferrite and bainitic ferrite is not less than 20% but not more than 80%, an area fraction of retained austenite is more than 10% but not more than 40%, and an area fraction of martensite is more than 0% but not more than 50%,
wherein a percentage of retained austenite having an aspect ratio of 0.5 or less in whole retained austenite is not less than 75% in area fraction, and
wherein a percentage of retained austenite present at a Bain group boundary in the retained austenite having an aspect ratio of 0.5 or less is not less than 50% in area fraction.

[2] The high strength cold rolled steel sheet according to [1] above, wherein the composition further includes at least one element selected from the group consisting of: by mass,
Ti in an amount of not less than 0.005% but not more than 0.035%,
Nb in an amount of not less than 0.005% but not more than 0.035%,
V in an amount of not less than 0.005% but not more than 0.035%,
Mo in an amount of not less than 0.005% but not more than 0.035%,
B in an amount of not less than 0.0003% but not more than 0.0100%,
Cr in an amount of not less than 0.05% but not more than 1.00%,
Ni in an amount of not less than 0.05% but not more than 1.00%,
Cu in an amount of not less than 0.05% but not more than 1.00%, Sb in an amount of not less than 0.002% but not more than 0.050%,
Sn in an amount of not less than 0.002% but not more than 0.050%,
Ca in an amount of not less than 0.0005% but not more than 0.0050%,
Mg in an amount of not less than 0.0005% but not more than 0.0050%, and
REM in an amount of not less than 0.0005% but not more than 0.0050%.

[3] The high strength cold rolled steel sheet according to [1] or [2] above, wherein C and Mn in the composition satisfy, in percentage by mass, Formula (z):

$$7.5 \times C + Mn < 5.0 \quad (z)$$

where C and Mn represent amounts of relevant elements.

[4] The high strength cold rolled steel sheet according to any one of [1] to [3] above, wherein the high strength cold rolled steel sheet has a plating layer on its surface.

[5] A method of manufacturing the high strength cold rolled steel sheet according to any one of [1] to [4] above, the method comprising:
a hot rolling step of subjecting a steel material having the composition according to any one of [1] to [3] above to hot rolling to thereby obtain a hot rolled steel sheet;
a pickling step of pickling the hot rolled steel sheet;
a cold rolling step of subjecting the hot rolled steel sheet having been pickled to cold rolling at a rolling reduction of not less than 30% to thereby obtain a cold rolled steel sheet;
a first annealing step of heating the cold rolled steel sheet at an annealing temperature $T_1$ of not lower than an $Ac_3$ temperature but not higher than 950° C., subsequently cooling the cold rolled steel sheet from the annealing temperature $T_1$ to a cooling stop temperature $T_2$ of not lower than 250° C. but lower than 350° C. at an average cooling rate of more than 10° C./s, and then retaining the cold rolled steel sheet at the cooling stop temperature $T_2$ for at least 10 s, thereby obtaining a first cold rolled and annealed steel sheet; and
a second annealing step of heating the first cold rolled and annealed steel sheet at an annealing temperature $T_3$ of not lower than 700° C. but not higher than 850° C., and then cooling the first cold rolled and annealed steel sheet from the annealing temperature $T_3$ to a cooling stop temperature $T_4$ of not lower than 300° C. but not higher than 500° C., thereby obtaining a second cold rolled and annealed steel sheet.

[6] The method according to [5] above, further including a plating step of performing galvanizing treatment, treatment involving galvanizing and alloying, or electrogalvanizing treatment.

There can be provided a high strength cold rolled steel sheet having not only a tensile strength of 980 MPa or more but also excellent ductility and excellent stretch flangeability and also having a lower defect rate in a hole expanding test, as well as a method of manufacturing the same.

The high strength cold rolled steel sheet is suitable for parts of transport machinery such as automobiles and structural steel such as architectural steel. We make it possible to apply the high strength cold rolled steel sheet to wider fields, thus achieving a much larger effect from an industrial viewpoint.

REFERENCE SIGNS LIST

B1, B2, B3 Bain group
$RA_1$, $RA_2$ retained austenite

DETAILED DESCRIPTION

High Strength Cold Rolled Steel Sheet

Our high strength cold rolled steel sheet has the composition including: by mass, C in an amount of more than 0.15% but not more than 0.45%, Si in an amount of not less than 0.50% but not more than 2.50%, Mn in an amount of not less than 1.50% but not more than 3.00%, P in an amount of not more than 0.050%, S in an amount of not more than 0.0100%, Al in an amount of not less than 0.010% but not more than 0.100%, and N in an amount of not more than 0.0100%, with balance Fe and inevitable impurities, wherein in its microstructure, a total area fraction of ferrite and bainitic ferrite is not less than 20% but not more than 80%, an area fraction of retained austenite is more than 10% but not more than 40%, and an area fraction of martensite is more than 0% but not more than 50%, wherein a percentage of retained austenite having an aspect ratio of 0.5 or less in whole retained austenite is not less than 75% in area fraction, and wherein a percentage of retained austenite present at a Bain group boundary in the retained austenite having an aspect ratio of 0.5 or less is not less than 50% in area fraction.

The thickness of the high strength cold rolled steel sheet is, for example, not more than 5 mm.

Composition

Hereinafter, first, the composition (component composition) of the high strength cold rolled steel sheet is described. The unit of amounts of all elements in the component composition is "mass %" but is simply stated as "%" unless otherwise noted.

C: More than 0.15% but not More than 0.45%

C stabilizes austenite and secures a desired area fraction of retained austenite, thus effectively contributing to the improvement in ductility, and also increases the hardness of martensite, thus contributing to an increase in strength. C needs to be contained in an amount of more than 0.15% to sufficiently achieve those effects.

When, however, C is contained in a large amount, i.e., more than 0.45%, this leads to deterioration in toughness, weldability and delayed fracture resistance as well as to the generation of an excessive amount of martensite, resulting in reduced ductility and stretch flangeability.

Hence, the C content is more than 0.15% but not more than 0.45%, preferably not less than 0.18% but not more than 0.42%, and more preferably not less than 0.20% but not more than 0.40%.

Si: Not Less than 0.50% but not More than 2.50%

Si suppresses generation of carbide (cementite) and promotes partitioning of carbon in austenite to thereby stabilize the austenite, thus contributing to the improvement in ductility of the steel sheet. Si present in the state of solid solution in ferrite improves work hardenability, thus contributing to the improvement in ductility of the ferrite itself.

Si needs to be contained in an amount of not less than 0.50% to sufficiently achieve those effects.

When, however, the Si content exceeds 2.50%, the effect of suppressing the generation of carbide (cementite) and contributing to the stabilization of retained austenite is saturated and, in addition, since the amount of Si present in the state of solid solution in ferrite becomes excessive, the ductility decreases.

Hence, the Si content is not less than 0.50% but not more than 2.50%, preferably not less than 0.80% but not more than 2.30%, and more preferably not less than 1.00% but not more than 2.10%.

Mn: Not Less than 1.50% but not More than 3.00%

Mn is an austenite stabilizing element that stabilizes austenite and thereby contributes to the improvement in ductility, and also increases hardenability and thereby promotes generation of martensite, thus contributing to increased strength of the steel sheet. Mn needs to be contained in an amount of not less than 1.50% to sufficiently achieve those effects.

When, however, the Mn content exceeds 3.00%, martensite is excessively generated and this leads to the deterioration in ductility and stretch flangeability.

Hence, the Mn content is not less than 1.50% but not more than 3.00% and preferably not less than 1.80% but not more than 2.70%.

P: Not More than 0.050%

P is a harmful element that is segregated in a grain boundary and acts to reduce elongation, induce cracking during work and worsen an anti-crash property. Accordingly, the P content is not more than 0.050%, with not more than 0.010% being preferred.

However, excessive dephosphorization causes longer refining time and increased cost and, therefore, the P content is preferably not less than 0.002%.

S: Not More than 0.0100%

S present as MnS in steel promotes the generation of voids during punching and also acts as starting points of generation of voids during work, thus reducing stretch flangeability. Accordingly, the amount of S is preferably reduced as much as possible and is not more than 0.0100%, with not more than 0.0050% being preferred.

However, excessive desulfurization causes longer refining time and increased cost and, therefore, the S content is preferably not less than 0.0002%.

Al: Not Less than 0.010% but not More than 0.100%

Al is an element acting as a deoxidizer. Al is contained in an amount of not less than 0.010% to achieve that effect.

When, however, the Al content is excessive, Al remains as aluminum oxide in a steel sheet, and the aluminum oxide easily aggregates and coarsens, which causes poor stretch flangeability. Accordingly, the Al content is not more than 0.100%.

N: Not More than 0.0100%

N present as AlN in steel promotes generation of coarse voids during punching and also acts as starting points of generation of coarse voids during work, thus reducing stretch flangeability. Accordingly, the amount of N is preferably reduced as much as possible, and the N content is not more than 0.0100%, with not more than 0.0060% being preferred.

However, excessive denitrification causes longer refining time and increased cost and, therefore, the N content is preferably not less than 0.0005%.

$7.5 \times C + Mn$

C and Mn are elements both contributing to formation of hard martensite. With the amounts of those elements being within the foregoing ranges, respectively, when $7.5 \times C + Mn$ is less than 5.0, stretch flangeability tends to be further improved. This is probably because C and Mn do not independently determine the nature of martensite but influence each other and, when $7.5 \times C + Mn$ is less than 5.0, martensite is prevented from excessively hardening, leading to more excellent stretch flangeability.

Thus, it is preferable that C and Mn satisfy Formula (z) in percentage by mass.

$$7.5 \times C + Mn < 5.0 \qquad (z)$$

In Formula (z), C and Mn represent the amounts of the relevant elements.

The lower limit of $7.5 \times C + Mn$ is not particularly limited and is preferably not less than 3.0 and more preferably not less than 3.5.

Other Components (Elements)

The composition above may optionally further include at least one element selected from the group consisting of: by mass, Ti in an amount of not less than 0.005% but not more than 0.035%, Nb in an amount of not less than 0.005% but not more than 0.035%, V in an amount of not less than 0.005% but not more than 0.035%, Mo in an amount of not less than 0.005% but not more than 0.035%, B in an amount of not less than 0.0003% but not more than 0.0100%, Cr in an amount of not less than 0.05% but not more than 1.00%, Ni in an amount of not less than 0.05% but not more than 1.00%, Cu in an amount of not less than 0.05% but not more than 1.00%, Sb in an amount of not less than 0.002% but not more than 0.050%, Sn in an amount of not less than 0.002% but not more than 0.050%, Ca in an amount of not less than 0.0005% but not more than 0.0050%, Mg in an amount of not less than 0.0005% but not more than 0.0050%, and REM in an amount of not less than 0.0005% but not more than 0.0050%.

Ti: Not Less than 0.005% but not More than 0.035%

Ti forms carbonitride and enhances the strength of steel using a precipitation hardening effect. In adding Ti, the Ti content is preferably not less than 0.005% to effectively exhibit the effect. When, however, the Ti content is excessive, precipitates are excessively generated, and this may result in poor ductility.

Hence, the Ti content is preferably not less than 0.005% but not more than 0.035% and more preferably not less than 0.005% but not more than 0.020%.

Nb: Not Less than 0.005% but not More than 0.035%

Nb forms carbonitride and enhances the strength of steel using a precipitation hardening effect. In adding Nb, the Nb content is preferably not less than 0.005% to effectively exhibit the effect. When, however, the Nb content is excessive, precipitates are excessively generated, and this may result in poor ductility.

Hence, the Nb content is preferably not less than 0.005% but not more than 0.035% and more preferably not less than 0.005% but not more than 0.030%.

V: Not Less than 0.005% but not More than 0.035%

V forms carbonitride and enhances the strength of steel using a precipitation hardening effect. In adding V, the V content is preferably not less than 0.005% to effectively exhibit the effect. When, however, the V content is excessive, precipitates are excessively generated, and this may result in poor ductility.

Hence, the V content is preferably not less than 0.005% but not more than 0.035% and more preferably not less than 0.005% but not more than 0.030%.

Mo: Not Less than 0.005% but not More than 0.035%

Mo forms carbonitride and enhances the strength of steel using a precipitation hardening effect. In adding Mo, the Mo content is preferably not less than 0.005% to effectively exhibit the effect. When, however, the Mo content is excessive, precipitates are excessively generated, and this may result in poor ductility.

Hence, the Mo content is preferably not less than 0.005% but not more than 0.035% and more preferably not less than 0.005% but not more than 0.030%.

B: Not Less than 0.0003% but not More than 0.0100%

B enhances hardenability and promotes generation of martensite, and is therefore useful as a steel strengthening element. The B content is preferably not less than 0.0003% to effectively exhibit the effects. When, however, the B content is excessive, martensite is excessively generated, and this may result in poor ductility.

Hence, the B content is preferably not less than 0.0003% but not more than 0.0100%.

Cr: Not Less than 0.05% but not More than 1.00%

Cr enhances hardenability and promotes generation of martensite, and is therefore useful as a steel strengthening element. The Cr content is preferably not less than 0.05% to effectively exhibit the effects. When, however, the Cr content is excessive, martensite is excessively generated, and this may result in poor ductility.

Hence, the Cr content is preferably not less than 0.05% but not more than 1.00%.

Ni: Not Less than 0.05% but not More than 1.00%

Ni enhances hardenability and promotes generation of martensite, and is therefore useful as a steel strengthening element. The Ni content is preferably not less than 0.05% to effectively exhibit the effects. When, however, the Ni content is excessive, martensite is excessively generated, and this may result in poor ductility.

Hence, the Ni content is preferably not less than 0.05% but not more than 1.00%.

Cu: Not Less than 0.05% but not More than 1.00%

Cu enhances hardenability and promotes generation of martensite, and is therefore useful as a steel strengthening element. The Cu content is preferably not less than 0.05% to effectively exhibit the effects. When, however, the Cu content is excessive, martensite is excessively generated, and this may result in poor ductility.

Hence, the Cu content is preferably not less than 0.05% but not more than 1.00%.

Sb: Not Less than 0.002% but not More than 0.050%

Sb has the effect of suppressing decarburization in a steel sheet surface layer (the region of about several tens of micrometers) caused by nitridization and oxidation of the surface of the steel sheet. Owing to this effect, the amount of austenite generated at the surface of the steel sheet is prevented from decreasing, which is effective at ensuring desired ductility. The Sb content is preferably not less than 0.002% to effectively exhibit the effect. When, however, the Sb content is excessive, this may result in lower toughness.

Hence, the Sb content is preferably not less than 0.002% but not more than 0.050%.

Sn: Not Less than 0.002% but not More than 0.050%

Sn has the effect of suppressing decarburization in a steel sheet surface layer (the region of about several tens of micrometers) caused by nitridization and oxidation of the surface of the steel sheet. Owing to this effect, the amount of austenite generated at the surface of the steel sheet is prevented from decreasing, which is effective at ensuring desired ductility. The Sn content is preferably not less than 0.002% to effectively exhibit the effect. When, however, the Sn content is excessive, this may result in lower toughness.

Hence, the Sn content is preferably not less than 0.002% but not more than 0.050%.

Ca: Not Less than 0.0005% but not More than 0.0050%

Ca has the effect of controlling the form of sulfide inclusions, and this effect is beneficial in suppressing a decrease in local ductility. In adding Ca, the Ca content is preferably not less than 0.0005% to obtain the effect. When, however, the Ca content is excessive, the effect may be saturated.

Hence, the Ca content is preferably not less than 0.0005% but not more than 0.0050%.

Mg: Not Less than 0.0005% but not More than 0.0050%

Mg has the effect of controlling the form of sulfide inclusions, and this effect is beneficial in suppressing a decrease in local ductility. In adding Mg, the Mg content is preferably not less than 0.0005% to obtain the effect. When, however, the Mg content is excessive, the effect may be saturated.

Hence, the Mg content is preferably not less than 0.0005% but not more than 0.0050%.

REM: Not Less than 0.0005% but not More than 0.0050%

REM (rare earth metal) has the effect of controlling the form of sulfide inclusions, and this effect is beneficial in suppressing a decrease in local ductility. In adding REM, the REM content is preferably not less than 0.0005% to obtain the effect. When, however, the REM content is excessive, the effect may be saturated.

Hence, the REM content is preferably not less than 0.0005% but not more than 0.0050%.

Balance Fe and Inevitable Impurities

In the foregoing composition, the remainder except the components above consists of Fe (balance Fe) and inevitable impurities.

Microstructure of Steel Sheet

Next, the microstructure in the high strength cold rolled steel sheet is described.

Total Area Fraction of Ferrite and Bainitic Ferrite: Not Less than 20% but not More than 80%

Ferrite and bainitic ferrite are soft steel microstructures and contribute to the improvement in ductility of the steel sheet. Since carbon does not dissolve in those microstructures very well, carbon is discharged into austenite, and this makes austenite more stable, thus improving ductility.

To provide necessary ductility to a steel sheet, the total area fraction of ferrite and bainitic ferrite needs to be not less than 20%.

When, however, the total area fraction of ferrite and bainitic ferrite exceeds 80%, it is difficult to ensure a tensile strength of 980 MPa or more.

Thus, the total area fraction of ferrite and bainitic ferrite is not less than 20% but not more than 80%.

Area Fraction of Retained Austenite: More than 10% but not More than 40%

While retained austenite is a ductile microstructure itself, retained austenite also contributes to the improvement in ductility through its strain-induced transformation. The area fraction of retained austenite needs to be more than 10% to obtain this effect.

When, however, retained austenite is included in a large amount, specifically, more than 40% in area fraction, the stability of retained austenite decreases and, accordingly, strain-induced transformation occurs in an early stage, leading to lower ductility.

Thus, the area fraction of retained austenite is more than 10% but not more than 40%.

The volume fraction of retained austenite is calculated by the method described below, and the result is taken as the area fraction.

Area Fraction of Martensite: More than 0% but not More than 50%

The term "martensite" herein includes fresh martensite and tempered martensite.

Martensite is an extremely hard microstructure and contributes to an increase in strength of the steel sheet. The area fraction of martensite is more than 0% (excluding 0%) and is preferably not less than 3% for the purpose of increasing the strength of the steel sheet.

When, however, martensite is included by more than 50% in area fraction, the desired ductility and stretch flangeability cannot be ensured.

Hence, the total area fraction of martensite is more than 0% but not more than 50% and preferably not less than 3% but not more than 50%.

The microstructure of the high strength cold rolled steel sheet may be composed of ferrite and bainitic ferrite, retained austenite, and martensite as above such that the total area fraction thereof constitute 100% of the microstructure, or may additionally include another microstructure such as pearlite to constitute 100% of the microstructure.

Percentage of Retained Austenite Having an Aspect Ratio of 0.5 or Less in Whole Retained Austenite: Not Less than 75% in Area Fraction While retained austenite improves ductility of the steel sheet, the degree of contribution to ductility improvement varies depending on its shape. Retained austenite having an aspect ratio of 0.5 or less is more stable in working and thus more effective at improving ductility, compared to retained austenite having an aspect ratio of more than 0.5.

Retained austenite having an aspect ratio of more than 0.5 with low work stability becomes hard martensite in an early stage of punching carried out before a hole expanding test, whereby coarse voids are easily generated therearound. In particular, when such retained austenite is exposed in many places on a punched edge face, edge face cracking is induced, which causes hole expanding test defect and increases the defect rate in a hole expanding test.

In contrast, retained austenite having an aspect ratio of 0.5 or less deforms along the form of the microstructure so that voids are hardly generated therearound.

To ensure desired ductility and sufficiently reduce the defect rate in a hole expanding test, the percentage of retained austenite having an aspect ratio of 0.5 or less in the whole retained austenite should be not less than 75% in area fraction, with not less than 80% being preferred.

The upper limit of the percentage is not particularly limited and may be 100%. Percentage of retained austenite present at a Bain group boundary in retained austenite having an aspect ratio of 0.5 or less: Not less than 50% in area fraction Retained austenite present at a Bain group boundary is described first.

In martensite and bainite, 24 variants having the Kurdjumov-Sachs (K-S) relationship may be generated from one prior austenite grain. The variants generated from one prior austenite grain can be classified into three Bain groups (see, for example, Goro Miyamoto and three others, "Crystallographic restriction in martensite and bainite transformations in steels" *Journal of the Japan Institute of Metals and Materials*, The Japan Institute of Metals and Materials, July 2015, vol. 79, No. 7, pp. 339-347).

Since the high strength cold rolled steel sheet is obtained through plural annealing steps as described later, although the microstructure of the steel sheet is different from martensite and bainite transformed from an austenite single phase, portions determined to be a bcc phase can be classified into the groups in the same manner as above.

Figure 1:
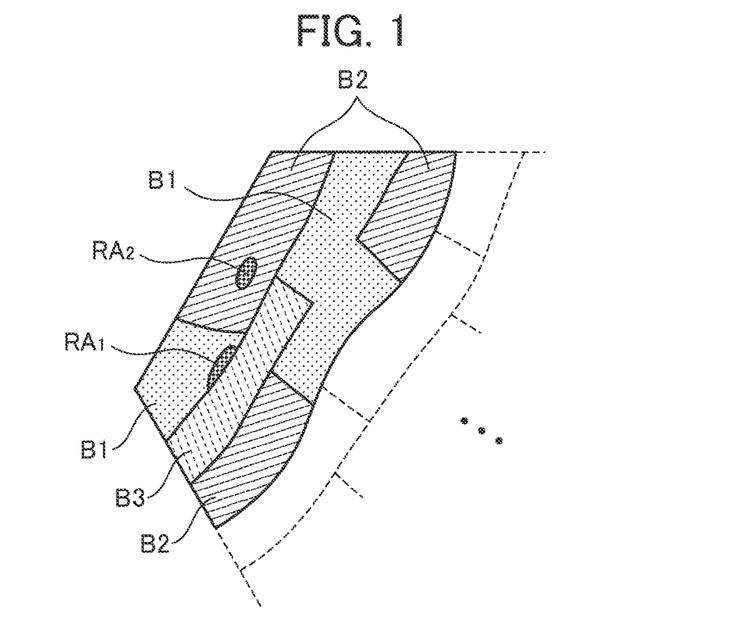
FIG. 1 is a schematic view showing a part (a region considered to be generated from one prior austenite grain) of microstructure of a steel sheet.

FIG. 1 is a schematic view showing a part (a region that is considered to be generated from one prior austenite grain) of microstructure of a steel sheet. The microstructure of the steel sheet shown in FIG. 1 is constituted of three Bain groups (B1 to B3). The regions of the same Bain group are given the same hatching pattern.

Retained austenite is also present in the microstructure of the steel sheet shown in FIG. 1. A part of retained austenite indicated by "$RA_2$" is present within a region of the Bain group B2. Another part of retained austenite indicated by "$RA_1$" is present at a boundary between a Bain group B1 region and a Bain group B3 region.

The retained austenite indicated by "$RA_1$" is retained austenite present at a Bain group boundary.

As long as retained austenite having an aspect ratio of 0.5 or less is present at a Bain group boundary, even if retained austenite having an aspect ratio of more than 0.5 is present, cracking in a punched edge face caused thereby can be suppressed, thus remarkably reducing the defect rate in a hole expanding test.

While the mechanism of this is not clear, we believe as follows: When retained austenite having an aspect ratio of 0.5 or less is present to overlap a Bain group boundary where a misorientation is large and stress is easily concentrated, this configuration functions to mitigate stress concentrated due to the deformation of retained austenite and work-induced martensite transformation. Consequently, the stress concentration around retained austenite having an aspect ratio of more than 0.5 present in the vicinity is reduced, whereby occurrence of voids and cracking is suppressed.

To sufficiently reduce the defect rate in a hole expanding test, the percentage of retained austenite present at a Bain group boundary in the retained austenite having an aspect ratio of 0.5 or less should be not less than 50% and preferably not less than 65% in area fraction.

The upper limit of the percentage is not particularly limited and may be 100%, with 95% or less being preferred.

Plating Layer

The high strength cold rolled steel sheet may further have a plating layer on its surface for the purpose of improving corrosion resistance and other properties. Preferred plating layers include galvanizing layers, galvannealing layers and electrogalvanizing layers.

The types of galvanizing layers, galvannealing layers and electrogalvanizing layers are not particularly limited, and known galvanizing layers, known galvannealing layers and known electrogalvanizing layers are advantageously applicable.

An exemplary electrogalvanizing layer that may be used is a zinc alloy plating layer obtained by adding, to Zn, one or more of such elements as Fe, Cr, Ni, Mn, Co, Sn, Pb and Mo in suitable amounts in accordance with the intended purpose.

Method of Manufacturing High Strength Cold Rolled Steel Sheet

Next, our method of manufacturing a high strength cold rolled steel sheet (hereinafter, also simply referred to as "manufacturing method") is described.

Generally speaking, the manufacturing method is a method of obtaining the high strength cold rolled steel sheet as described above by subjecting a steel material having the foregoing composition to hot rolling, pickling, cold rolling and annealing in sequence. Annealing is divided into two steps in the manufacturing method.

Steel Material

The steel material is not particularly limited as long as it has the foregoing composition.

A steel making method to form the steel material is not particularly limited, and known steel making methods using a converter, an electric furnace or the like are applicable. It is preferable to form slabs (steel material) through continuous casting after the steel making process for the sake of productivity and other factors, and slabs may be formed through a known casting process such as ingot casting-blooming or thin slab continuous casting.

Hot Rolling Step

The hot rolling step is a step of subjecting the steel material having the foregoing composition to hot rolling to thereby obtain a hot rolled steel sheet.

The hot rolling step is not particularly limited as long as it is a step of heating the steel material having the foregoing composition and subjecting the same to hot rolling to thereby obtain a hot rolled steel sheet having a predetermined dimension, and regular types of hot rolling steps are applicable.

One example of regular types of hot rolling steps is a hot rolling step involving: heating a steel material to a heating temperature of not lower than 1100° C. but not higher than 1300° C.; subjecting the heated steel material to hot rolling at a finish rolling delivery temperature of not lower than 850° C. but not higher than 950° C.; after the hot rolling is finished, performing appropriate post-rolling cooling (specifically, for instance, post-rolling cooling in which cooling proceeds within a temperature range of 450° C. to 950° C. at an average cooling rate of not less than 20° C./s but not more than 100° C./s); and coiling the resulting sheet at a coiling temperature of not lower than 400° C. but not higher than 700° C., thereby obtaining a hot rolled steel sheet having predetermined dimension and shape.

Pickling Step

The pickling step is a step of pickling the hot rolled steel sheet obtained through the hot rolling step.

The pickling step is not particularly limited as long as the hot rolled steel sheet can be pickled to the extent that the steel sheet is allowed to be subjected to cold rolling, and regular types of pickling steps using, for example, hydrochloric acid or sulfuric acid are applicable.

Cold Rolling Step

The cold rolling step is a step of subjecting the hot rolled steel sheet having been pickled to cold rolling. More specifically, the cold rolling step is a step of subjecting the hot rolled steel sheet having been pickled to cold rolling at a rolling reduction of at least 30%, thereby obtaining a cold rolled steel sheet having a predetermined thickness.

Rolling Reduction in Cold Rolling: At Least 30%

The rolling reduction in cold rolling is at least 30%. When the rolling reduction is less than 30%, the amount of work is insufficient, leading to less nucleation sites of austenite. As a result of this, austenite becomes coarse and non-uniform in the next step, namely, a first annealing step, and lower bainite transformation is suppressed in a retaining stage in the first annealing step so that martensite is excessively generated. Accordingly, the steel sheet having undergone the first annealing step fails to have the microstructure constituted mainly of lower bainite. Portions being martensite after the first annealing step tend to generate retained austenite having an aspect ratio of more than 0.5 in a second annealing step that follows.

While the upper limit of the rolling reduction is determined by the ability of a cold rolling mill, an excessively high rolling reduction causes increased rolling load, and this may result in lower productivity. Therefore, the rolling reduction is preferably up to 70%.

The number of rolling passes and the rolling reduction for each pass are not particularly limited.

Annealing Step

The annealing step is a step of annealing the cold rolled steel sheet obtained through the cold rolling step and, more specifically, a step involving the first annealing step and the second annealing step described below.

First Annealing Step

The first annealing step is a step involving: heating the cold rolled steel sheet obtained through the cold rolling step at an annealing temperature $T_1$ of not lower than the $Ac_3$ temperature but not higher than 950° C.; subsequently cooling the steel sheet from the annealing temperature $T_1$ to a cooling stop temperature $T_2$ of not lower than 250° C. but lower than 350° C. at an average cooling rate of more than 10° C./s; and then retaining the steel sheet at the cooling stop temperature $T_2$ for at least 10 s, thereby obtaining a first cold rolled and annealed steel sheet.

The purpose of this step is to allow the microstructure of the steel sheet having undergone the first annealing step to be lower bainite. In particular, since portions being martensite after the first annealing step tend to generate retained austenite having an aspect ratio of more than 0.5 in the following second annealing step, if martensite is excessively generated in the first annealing step, it is difficult to obtain desired microstructure of the steel sheet.

By controlling the manufacture conditions to fall within the above ranges, a steel sheet having the microstructure constituted mainly of lower bainite can be obtained, and thus, the microstructure of the steel sheet can be altered to desired microstructure upon the second annealing step.

$Ac_3$ Temperature

The $Ac_3$ temperature (unit: ° C.) can be determined by the formula of Andrew et al. below.

$$Ac_3=910-203[C]^{1/2}+45[Si]-30[Mn]-20[Cu]-15[Ni]+11[Cr]+32[Mo]+104[V]+400[Ti]+460[Al]$$

The brackets in the above formula represent the amounts (unit: mass %) of elements stated in the respective brackets in the steel sheet. When a certain element is not contained, 0 is assigned in calculation.

Annealing Temperature $T_1$: Not Lower than $Ac_3$ Temperature but not Higher than 950° C.

When the annealing temperature $T_1$ is lower than the $Ac_3$ temperature, this causes ferrite to remain during annealing, and in a cooling stage that follows, ferrite grows taking the ferrite having remained during the annealing as nucleus. As a consequence, C is distributed in austenite, whereby lower bainite transformation is suppressed in the retaining stage that comes later, and martensite is excessively generated. Thus, the steel sheet having undergone the first annealing step cannot have the microstructure constituted mainly of lower bainite.

On the other hand, when the annealing temperature $T_1$ exceeds 950° C., austenite grains become too coarse, whereby lower bainite transformation is suppressed in the retaining stage that follows cooling, and martensite is excessively generated. Thus, the steel sheet having undergone the first annealing step fails to have the microstructure constituted mainly of lower bainite.

Portions being martensite after the first annealing step tend to generate retained austenite having an aspect ratio of more than 0.5 in a second annealing step that follows.

Therefore, the annealing temperature $T_1$ is not lower than the $Ac_3$ temperature but not higher than 950° C.

The retaining time at the annealing temperature $T_1$ is not particularly limited and, for example, not less than 10 s but not more than 1000 s.

Average Cooling Rate from Annealing Temperature $T_1$ to Cooling Stop Temperature $T_2$: More than 10° C./s When the average cooling rate from the annealing temperature $T_1$ to the cooling stop temperature $T_2$ is 10° C./s or less, ferrite is generated during cooling. As a consequence, C is distributed in austenite, whereby lower bainite transformation is suppressed in the retaining stage that comes later, and martensite is excessively generated. Thus, the steel sheet having undergone the first annealing step cannot have the microstructure constituted mainly of lower bainite. Portions being martensite after the first annealing step tend to generate retained austenite having an aspect ratio of more than 0.5 in a second annealing step that follows.

Therefore, the average cooling rate from the annealing temperature $T_1$ to the cooling stop temperature $T_2$ is more than 10° C./s and preferably not less than 15° C./s.

The upper limit of the average cooling rate is not particularly limited. However, since a huge cooling device is necessary to ensure an excessively high cooling rate, it is preferable that the average cooling rate be not more than 50° C./s in view of production engineering, equipment investment and other factors.

Cooling is preferably gas cooling, or may be a combination of different types of cooling such as furnace cooling and mist cooling.

Cooling Stop Temperature $T_2$: Not Lower than 250° C. but Lower than 350° C.

When the cooling stop temperature $T_2$ is lower than 250° C., martensite is excessively generated in the microstructure of the steel sheet. Portions being martensite after the first annealing step tend to generate retained austenite having an aspect ratio of more than 0.5 in a second annealing step that follows.

On the other hand, when the cooling stop temperature $T_2$ is 350° C. or higher, upper bainite is generated instead of lower bainite. In upper bainite, the sizes of regions of the same Bain group are remarkably large compared to lower bainite and, therefore, a large amount of retained austenite having an aspect ratio of 0.5 or less is generated in the regions of the same Bain group after the following second annealing step, and the microstructure of the steel sheet is not altered to desired microstructure upon the second annealing step.

Therefore, the cooling stop temperature $T_2$ is not lower than 250° C. but lower than 350° C. and preferably not lower than 270° C. but not higher than 340° C.

Retaining Time at Cooling Stop Temperature $T_2$: Not Less than 10 s

When the retaining time at the cooling stop temperature $T_2$ is less than 10 s (seconds), lower bainite transformation is not fully completed. This leads to generation of an excessive amount of martensite, and desired microstructure cannot be obtained in the following second annealing step. Portions being martensite after the first annealing step tend to generate retained austenite having an aspect ratio of more than 0.5 in a second annealing step that follows.

Therefore, the retaining time at the cooling stop temperature $T_2$ is not less than 10 s, with not less than 30 s being preferred.

The upper limit of the retaining time at the cooling stop temperature $T_2$ is not particularly limited but is preferably not more than 1800 s because in retaining steel sheets for an excessively long time, long and large production equipment is required and the productivity of steel sheets is remarkably decreased.

After being retained at the cooling stop temperature $T_2$, the steel sheet may be cooled to room temperature before the following second annealing step or may successively be heated to conduct the second annealing step without a cooling process. To successively conduct the first annealing step and the second annealing step without cooling the steel sheet to room temperature between those steps, two heating furnaces for a regular type of continuous annealing line (CAL) are necessary in one line. Actually, the first annealing step is carried out with a CAL, and then the steel sheet is again transported through the CAL to carry out the second annealing step.

Second Annealing Step

The second annealing step is a step involving: heating (re-heating) the first cold rolled and annealed steel sheet obtained through the first annealing step at an annealing temperature $T_3$ of not lower than 700° C. but not higher than 850° C.; and then cooling the steel sheet from the annealing temperature $T_3$ to a cooling stop temperature $T_4$ of not lower than 300° C. but not higher than 500° C., thereby obtaining a second cold rolled and annealed steel sheet.

Annealing Temperature $T_3$: Not Lower than 700° C. but not Higher than 850° C.

When the annealing temperature $T_3$ is lower than 700° C., a sufficient amount of austenite is not generated through annealing and, accordingly, a desired amount of retained austenite cannot be ensured in the microstructure of the steel sheet having undergone the second annealing step, and the amount of ferrite becomes excessive.

On the other hand, an annealing temperature $T_3$ of higher than 850° C. causes generation of an excessive amount of austenite, and a microstructure control effect imparted before the second annealing step is initialized. This makes it difficult to adjust the percentage of the retained austenite having an aspect ratio of 0.5 or less and the percentage of retained austenite present at a Bain group boundary in the retained austenite having an aspect ratio of 0.5 or less, to desired values.

Therefore, the annealing temperature $T_3$ is not lower than 700° C. but not higher than 850° C. and preferably not lower than 710° C. but not higher than 830° C.

The retaining time at the annealing temperature $T_3$ is not particularly limited and is, for example, not less than 10 s but not more than 1000 s.

The average cooling rate from the annealing temperature $T_3$ to the cooling stop temperature $T_4$ is not particularly limited and is, for example, not less than 5° C./s but not more than 50° C./s.

Cooling Stop Temperature $T_4$: Not Lower than 300° C. but not Higher than 500° C.

A cooling stop temperature $T_4$ of lower than 300° C. leads to insufficient carbon partitioning in austenite, resulting in a decreased amount of retained austenite and the generation of a large amount of martensite. Thus, desired microstructure of the steel sheet is not obtained.

On the other hand, when the cooling stop temperature $T_4$ is higher than 500° C., large amounts of ferrite and bainitic ferrite are generated while pearlite is generated from austenite so that the amount of retained austenite is decreased. Thus, desired microstructure of the steel sheet is not obtained.

The retaining time at the cooling stop temperature $T_4$ is not particularly limited and is, for example, not less than 10 s but not more than 1800 s.

The second cold rolled and annealed steel sheet after being retained at the cooling stop temperature $T_4$ is preferably cooled. This cooling is not particularly limited. The steel sheet may be cooled to a desired temperature such as room temperature by any method, for instance, by being left to cool.

When a plating step described below is not performed, the second cold rolled and annealed steel sheet obtained through the second annealing step is to be the high strength cold rolled steel sheet.

Plating Step

The second cold rolled and annealed steel sheet obtained through the second annealing step may be further subjected to plating treatment to form a plating layer on its surface. In this example, the second cold rolled and annealed steel sheet having a plating layer on its surface is to be the high strength cold rolled steel sheet.

For the plating treatment, galvanizing treatment, treatment involving galvanizing and alloying, or electrogalvanizing treatment is preferred. The types of galvanizing treatment, treatment involving galvanizing and alloying, and electrogalvanizing treatment are not particularly limited, and known galvanizing treatment, known treatment involving galvanizing and alloying, and known electrogalvanizing treatment are advantageously applicable.

The plating treatment may be preceded by pretreatment such as degreasing or phosphatizing.

One preferred example of the galvanizing treatment is the treatment involving immersing the second cold rolled and annealed steel sheet into a galvanizing bath using a regular continuous galvanizing line to thereby form a predetermined amount of galvanizing layer on its surface.

In immersion into a galvanizing bath, the temperature of the second cold rolled and annealed steel sheet is preferably adjusted by reheating or cooling to be not lower than the temperature lower by 50° C. than the galvanizing bath temperature but not higher than the temperature higher by 80° C. than the galvanizing bath temperature.

The galvanizing bath temperature is preferably not lower than 440° C. but not higher than 500° C.

The galvanizing bath may contain, in addition to pure zinc, Al, Fe, Mg, Si or another component.

The coating weight of the galvanizing layer may be adjusted as desired by, for instance, controlling gas wiping and is preferably about 45 g/m² per one side.

The plating layer (galvanizing layer) formed by the galvanizing treatment may optionally be subjected to usual alloying treatment to form a galvannealing layer.

The temperature of the alloying treatment is preferably not lower than 460° C. but not higher than 600° C.

In forming the galvannealing layer, the effective Al concentration in a galvanizing bath is preferably adjusted to 0.10 to 0.22 mass % for the purpose of ensuring desired plating appearance.

One preferred example of the electrogalvanizing treatment is the treatment that forms a predetermined amount of electrogalvanizing layer on a surface of the second cold rolled and annealed steel sheet using a regular electrogalvanizing line.

The electrogalvanizing layer can be formed to a predetermined coating weight by, for instance, adjusting the sheet transport speed or the electric current value, and the coating weight is preferably about 30 g/m² per one side.

Examples

Our steel sheets and methods are specifically described below with reference to examples. However, this disclosure is not limited thereto.

Method of Manufacturing Cold Rolled Steel Sheet

Each molten steel having the composition shown in Table 1 was subjected to a known steel making process and continuously casted into a slab (steel material) having a thickness of 300 mm. The resulting slab was subjected to hot rolling to obtain a hot rolled steel sheet. The hot rolled steel sheet obtained was pickled by a known method and subsequently subjected to cold rolling at a rolling reduction shown in Tables 2 and 3 below, thereby obtaining a cold rolled steel sheet (thickness: 1.4 mm).

The cold rolled steel sheet obtained was annealed under the conditions shown in Tables 2 and 3 below to obtain a second cold rolled and annealed steel sheet.

The annealing step was a two-stage step including the first annealing step and the second annealing step.

The steel sheet was cooled to room temperature between the first and second annealing steps.

The retaining time at the annealing temperature $T_1$ was 100 s in the first annealing step.

In the second annealing step, the retaining time at the annealing temperature $T_3$ was 100 s, the average cooling rate from the annealing temperature $T_3$ to the cooling stop temperature $T_4$ was 20° C./s, and the retaining time at the cooling stop temperature $T_4$ was 250 s.

For part of the second cold rolled and annealed steel sheets, annealing was further followed by galvanizing treatment to form galvanizing layers on their surfaces, thereby forming galvanized steel sheets.

The galvanizing treatment was adjusted such that the resulting plating layer had a coating weight of 45 g/m² per one side by reheating the second cold rolled and annealed steel sheet to a temperature of not lower than 430° C. but not higher than 480° C. as needed and immersing the steel sheet in a galvanizing bath (bath temperature: 470° C.) using a continuous galvanizing line. The bath composition was Zn-0.18 mass % of Al.

In this process, for part of the galvanized steel sheets, the bath composition was Zn-0.14 mass % of Al, and the steel sheets were alloyed at 520° C. after plating, thus obtaining galvannealed steel sheets.

The Fe concentration of the plating layer was not less than 9 mass % but not more than 12 mass %.

For another part of the second cold rolled and annealed steel sheets, annealing was further followed by electrogalvanizing treatment using an electrogalvanizing line such that the resulting plating layers had a coating weight of 30 g/m² per one side, thus forming electrogalvanized steel sheets.

In Tables 4 and 5, the second cold rolled and annealed steel sheets on which no plating layer was formed are represented by "CR," the galvanized steel sheets "GI," the galvannealed steel sheets "GA," and the electrogalvanized steel sheets "EG."

The second cold rolled and annealed steel sheets on which no plating layer was formed and the second cold rolled and annealed steel sheets on which the respective plating layers were formed (galvanized steel sheets, galvannealed steel sheets and electrogalvanized steel sheets) are hereinafter collectively called "cold rolled steel sheet(s)."

The cold rolled steel sheets were thus manufactured.

Evaluation

Specimens were taken from the cold rolled steel sheets obtained, and microstructure observation, measurement of retained austenite area fraction, a tensile test and a hole expanding test were conducted. The test methods are as follows.

Microstructure Observation

First, a specimen for microstructure observation was taken from each cold rolled steel sheet.

Next, the taken specimen was polished to have an observation surface in the position corresponding to ¼ of the sheet thickness in the rolling-direction cross section (L cross section). The observation surface was etched (etched with 1 vol % Nital) and observed in 10 fields within a 30 μm×35 μm field range with a scanning electron microscope (SEM at a magnification of 3000×). Those fields were imaged to obtain SEM images.

Using the obtained SEM images, the area fraction of each microstructure was determined by image analysis. The area fraction was an average of values of the 10 fields. In SEM images, ferrite and bainitic ferrite take on a gray color, and martensite and retained austenite take on a white color. Thus, the color tones were utilized to distinguish the respective microstructures. While it is difficult to accurately distinguish between ferrite and bainitic ferrite, what is important is the total area fraction of those microstructures and, therefore, the total area fraction of ferrite and bainitic ferrite was determined without distinguishing those microstructures.

The area fraction of retained austenite separately determined by X-ray diffraction was subtracted from the area fraction of the microstructures taking on a white color, and the result thereof used as the area fraction of martensite. The volume fraction of austenite determined by X-ray diffraction was regarded as equivalent to the area fraction.

Further, a specimen was polished by colloidal silica vibratory polishing to have an observation surface in the position corresponding to ¼ of the sheet thickness in the rolling-direction cross section (L cross section). The observation surface was made to be a mirror surface. Next, a work transformation phase at the observation surface caused by polishing strain was removed by ultra-low acceleration ion milling, whereafter electron backscatter diffraction (EBSD) measurement was carried out to obtain local crystal orientation data. In this process, the SEM magnification was 1500×, the step size was 0.04 μm, the measurement range was 40 μm$^2$, and the working distance was 15 mm. The obtained local orientation data was analyzed using the analysis software OIM Analysis 7. The analysis was conducted for three fields, and the average thereof was used.

Before the data analysis, a cleanup process by a Grain Dilation function (Grain Tolerance Angle: 5°, Minimum Grain Size: 5, Single Iteration: On) of the analysis software and a cleanup process by a Grain CI Standardization function (Grain Tolerance Angle: 5°, Minimum Grain Size: 5) thereof were each carried out one time. Thereafter, only the measurement points with CI value >0.1 were used for analysis.

Data on an fcc phase was analyzed using Area Fraction of a Grain Shape Aspect Ratio chart, and the percentage (area fraction) of retained austenite having an aspect ratio of 0.5 or less in the whole retained austenite was determined. In the above analysis, Method 2 was used as the Grain shape calculation method.

Further, for data on a bcc phase, regions of the same Bain group were colored with the same color by a highlighting function, and then, in the retained austenite having an aspect ratio of 0.5 or less as previously determined, the percentage of regions colored with another color, i.e., retained austenite present at a Bain group boundary (including a prior austenite grain boundary) was determined in area fraction.

Measurement of Area Fraction of Retained Austenite

A specimen for X-ray diffraction was taken from each cold rolled steel sheet, ground and polished to have a measurement surface in the position corresponding to ¼ of the sheet thickness. Then, the volume fraction of retained austenite was determined by X-ray diffraction, i.e., based on the diffracted X ray intensity. The incident X-ray was CoKα.

In the calculation of the volume fraction of retained austenite, the intensity ratio was calculated with every combination of integral intensities of peaks of {111}, {200}, {220} and {311} surfaces of the fcc phase (retained austenite) and {110}, {200} and {211} surfaces of the bcc phase, and the average of the results was obtained, thus determining the volume fraction of retained austenite.

The thus obtained volume fraction of austenite was defined as the area fraction.

Tensile Test

A JIS No. 5 specimen for tensile test (JIS Z 2001) was taken from each cold rolled steel sheet with the direction (C direction) perpendicular to the rolling direction being set as the tensile direction, and a tensile test was conducted in accordance with JIS Z 2241 to measure the tensile strength (TS) and the elongation (El).

Strength

The strength was determined to be high when the TS was 980 MPa or more.

Ductility

When the El was 25% or more with the TS being not less than 980 MPa but less than 1180 MPa, and when the El was 18% or more with the TS being not less than 1180 MPa, the ductility was determined to be high (good).

Hole Expanding Test

A specimen (size: 100 mm×100 mm) was taken from each cold rolled steel sheet, and a hole with an initial diameter do of 10 mm formed in the specimen by punching (clearance: 12.5% of the sheet thickness of the specimen). The thus obtained specimen was used to conduct a hole expanding test. Specifically, a conical punch having an apex angle of 60° was inserted into the hole with an initial diameter do of 10 mm from the side where the punch was situated in punching, to thereby expand the hole. The diameter d (unit: mm) of the hole at the time when a crack had penetrated the steel sheet (specimen) was measured, and the hole expansion ratio λ (unit: %) calculated by the following formula.

$$\text{Hole expansion ratio } \lambda = \{(d-d_0)/d_0\} \times 100$$

The hole expanding test was conducted 100 times for each steel sheet, and the average of the test results was used as the average hole expansion ratio λ (unit: %). The average hole expansion ratio λ is hereinafter also called "average λ."

Further, the probability of the hole expansion ratio λ being a half or less than a half of the average hole expansion ratio λ was determined, and this probability was used as the defect rate (unit: %) in the hole expanding test.

Stretch Flangeability

When the average λ was 20% or more with the TS being not less than 980 MPa but less than 1180 MPa, and when the average λ was 15% or more with the TS being not less than 1180 MPa, the stretch flangeability was determined to be good.

Defect Rate in Hole Expanding Test

The defect rate in the hole expanding test was determined to be low when the defect rate in the hole expanding test was 4% or less.

TABLE 1

| Type of steel | Component composition [mass %] | | | | | | | | 7.5 × C + Mn [mass %] | Ac₃ temp. [° C.] | Remarks |
|---|---|---|---|---|---|---|---|---|---|---|---|
| | C | Si | Mn | P | S | N | Al | Other | | | |
| A | 0.32 | 1.69 | 2.12 | 0.013 | 0.0020 | 0.0024 | 0.044 | — | 4.5 | 828 | Conforming steel |
| B | 0.31 | 1.59 | 2.55 | 0.017 | 0.0020 | 0.0043 | 0.014 | — | 4.9 | 798 | Conforming steel |
| C | 0.20 | 1.97 | 2.94 | 0.013 | 0.0011 | 0.0023 | 0.041 | — | 4.4 | 839 | Conforming steel |
| D | 0.22 | 1.40 | 2.05 | 0.015 | 0.0030 | 0.0058 | 0.024 | — | 3.7 | 827 | Conforming steel |
| E | 0.43 | 0.80 | 1.67 | 0.018 | 0.0052 | 0.0059 | 0.019 | Ti: 0.020 | 4.9 | 779 | Conforming steel |
| F | 0.32 | 2.40 | 2.34 | 0.014 | 0.0020 | 0.0040 | 0.054 | Nb: 0.020 | 4.7 | 858 | Conforming steel |
| G | 0.29 | 1.41 | 1.97 | 0.006 | 0.0022 | 0.0058 | 0.015 | V: 0.020 | 4.1 | 814 | Conforming steel |
| H | 0.17 | 1.70 | 2.65 | 0.009 | 0.0022 | 0.0044 | 0.013 | Mo: 0.020 | 3.9 | 829 | Conforming steel |
| I | 0.37 | 0.66 | 1.78 | 0.011 | 0.0032 | 0.0037 | 0.059 | B: 0.0015 | 4.6 | 790 | Conforming steel |
| J | 0.33 | 1.06 | 2.12 | 0.009 | 0.0020 | 0.0036 | 0.020 | Cr: 0.20 | 4.6 | 789 | Conforming steel |
| K | 0.26 | 1.93 | 2.55 | 0.018 | 0.0038 | 0.0054 | 0.016 | Ni: 0.10 | 4.5 | 823 | Conforming steel |
| L | 0.40 | 2.16 | 1.84 | 0.019 | 0.0024 | 0.0038 | 0.048 | Cu: 0.07 | 4.8 | 844 | Conforming steel |
| M | 0.21 | 1.39 | 2.62 | 0.007 | 0.0035 | 0.0054 | 0.059 | Sb: 0.011 | 4.2 | 828 | Conforming steel |
| N | 0.27 | 1.75 | 2.09 | 0.007 | 0.0026 | 0.0060 | 0.040 | Sn: 0.015 | 4.1 | 839 | Conforming steel |
| O | 0.31 | 2.34 | 1.87 | 0.020 | 0.0021 | 0.0050 | 0.041 | Ca: 0.0025 | 4.2 | 865 | Conforming steel |
| P | 0.34 | 1.54 | 2.34 | 0.004 | 0.0011 | 0.0057 | 0.052 | Mg: 0.0013 | 4.9 | 814 | Conforming steel |
| Q | 0.26 | 0.95 | 2.48 | 0.009 | 0.0009 | 0.0040 | 0.021 | REM: 0.0020 | 4.4 | 784 | Conforming steel |
| R | 0.13 | 1.34 | 1.71 | 0.005 | 0.0028 | 0.0027 | 0.033 | — | 2.7 | 861 | Comparative steel |
| S | 0.47 | 1.53 | 2.41 | 0.013 | 0.0012 | 0.0035 | 0.026 | — | 5.9 | 779 | Comparative steel |
| T | 0.32 | 0.35 | 2.18 | 0.016 | 0.0029 | 0.0055 | 0.011 | — | 4.6 | 750 | Comparative steel |
| U | 0.36 | 2.73 | 2.19 | 0.014 | 0.0022 | 0.0039 | 0.023 | — | 4.9 | 856 | Comparative steel |
| V | 0.26 | 1.90 | 1.14 | 0.008 | 0.0038 | 0.0046 | 0.020 | — | 3.1 | 867 | Comparative steel |
| W | 0.16 | 1.29 | 3.15 | 0.018 | 0.0015 | 0.0050 | 0.014 | — | 4.4 | 798 | Comparative steel |
| X | 0.39 | 1.42 | 1.94 | 0.016 | 0.0014 | 0.0030 | 0.046 | — | 4.9 | 810 | Conforming steel |
| Y | 0.31 | 1.37 | 2.30 | 0.006 | 0.0017 | 0.0030 | 0.026 | — | 4.6 | 802 | Conforming steel |
| Z | 0.23 | 1.39 | 1.93 | 0.004 | 0.0047 | 0.0027 | 0.022 | — | 3.7 | 827 | Conforming steel |
| AA | 0.21 | 0.98 | 2.34 | 0.013 | 0.0041 | 0.0053 | 0.057 | — | 3.9 | 817 | Conforming steel |
| AB | 0.16 | 1.19 | 2.38 | 0.017 | 0.0010 | 0.0035 | 0.041 | — | 3.6 | 830 | Conforming steel |
| AC | 0.45 | 1.35 | 1.56 | 0.018 | 0.0043 | 0.0036 | 0.053 | — | 4.9 | 812 | Conforming steel |
| AD | 0.31 | 1.68 | 1.53 | 0.020 | 0.0050 | 0.0032 | 0.039 | — | 3.9 | 845 | Conforming steel |
| AE | 0.25 | 0.54 | 2.46 | 0.005 | 0.0045 | 0.0048 | 0.021 | — | 4.3 | 769 | Conforming steel |
| AF | 0.32 | 2.47 | 2.26 | 0.015 | 0.0030 | 0.0038 | 0.010 | — | 4.7 | 843 | Conforming steel |
| AG | 0.37 | 1.52 | 2.35 | 0.012 | 0.0033 | 0.0022 | 0.049 | — | 5.1 | 807 | Conforming steel |

TABLE 2

| No. | Type of steel | Rolling reduction in cold rolling [%] | First annealing step | | | | Second annealing step | | Remarks |
|---|---|---|---|---|---|---|---|---|---|
| | | | Annealing temp. $T_1$ [° C.] | Average cooling rate [° C./s] | Cooling stop temp. $T_2$ [° C.] | Retaining time [s] | Annealing temp. $T_3$ [° C.] | Cooling stop temp. $T_4$ [° C.] | |
| 1 | A | 60 | 870 | 20 | 280 | 300 | 790 | 420 | Example |
| 2 | B | 65 | 870 | 20 | 330 | 500 | 740 | 410 | Example |
| 3 | C | 55 | 860 | 20 | 330 | 200 | 800 | 370 | Example |
| 4 | D | 40 | 830 | 20 | 300 | 600 | 800 | 470 | Example |
| 5 | E | 55 | 830 | 15 | 310 | 200 | 730 | 420 | Example |
| 6 | F | 55 | 910 | 15 | 300 | 200 | 810 | 480 | Example |
| 7 | G | 50 | 840 | 15 | 340 | 100 | 780 | 410 | Example |
| 8 | H | 40 | 900 | 15 | 340 | 400 | 770 | 460 | Example |
| 9 | I | 45 | 850 | 15 | 260 | 300 | 740 | 440 | Example |
| 10 | J | 60 | 810 | 15 | 300 | 200 | 760 | 470 | Example |
| 11 | K | 60 | 840 | 25 | 280 | 100 | 790 | 440 | Example |
| 12 | L | 45 | 870 | 25 | 340 | 300 | 810 | 470 | Example |
| 13 | M | 60 | 840 | 25 | 280 | 200 | 800 | 360 | Example |
| 14 | N | 60 | 890 | 11 | 300 | 100 | 790 | 380 | Example |
| 15 | O | 40 | 900 | 11 | 300 | 500 | 820 | 480 | Example |
| 16 | P | 55 | 870 | 40 | 250 | 200 | 760 | 370 | Example |
| 17 | Q | 45 | 870 | 40 | 290 | 30 | 720 | 390 | Example |
| 18 | R | 35 | 900 | 15 | 330 | 30 | 820 | 400 | Comparative example |
| 19 | S | 40 | 820 | 15 | 250 | 600 | 740 | 320 | Comparative example |
| 20 | T | 70 | 790 | 15 | 320 | 600 | 710 | 370 | Comparative example |
| 21 | U | 40 | 860 | 15 | 290 | 200 | 830 | 380 | Comparative example |
| 22 | V | 65 | 940 | 15 | 290 | 200 | 810 | 460 | Comparative example |
| 23 | W | 55 | 870 | 15 | 290 | 200 | 740 | 360 | Comparative example |
| 24 | A | 15 | 890 | 20 | 320 | 300 | 770 | 320 | Comparative example |
| 25 | A | 55 | 760 | 20 | 300 | 500 | 770 | 400 | Comparative example |
| 26 | A | 55 | 970 | 20 | 300 | 200 | 770 | 460 | Comparative example |

TABLE 3

| | | | First annealing step | | | | Second annealing step | | |
|---|---|---|---|---|---|---|---|---|---|
| No. | Type of steel | Rolling reduction in cold rolling [%] | Annealing temp. $T_1$ [° C.] | Average cooling rate [° C./s] | Cooling stop temp. $T_2$ [° C.] | Retaining time [s] | Annealing temp. $T_3$ [° C.] | Cooling stop temp. $T_4$ [° C.] | Remarks |
| 27 | A | 50 | 870 | <u>5</u> | 340 | 500 | 790 | 350 | Comparative example |
| 28 | A | 45 | 860 | 20 | <u>210</u> | 400 | 790 | 370 | Comparative example |
| 29 | A | 50 | 910 | 20 | <u>380</u> | 30 | 770 | 340 | Comparative example |
| 30 | A | 35 | 850 | 15 | 310 | <u>5</u> | 790 | 390 | Comparative example |
| 31 | A | 65 | 840 | 15 | 340 | 500 | <u>690</u> | 430 | Comparative example |
| 32 | A | 70 | 890 | 15 | 260 | 50 | <u>860</u> | 340 | Comparative example |
| 33 | A | 60 | 890 | 15 | 330 | 400 | 770 | <u>250</u> | Comparative example |
| 34 | A | 60 | 880 | 15 | 270 | 300 | 780 | <u>550</u> | Comparative example |
| 35 | A | 60 | 910 | 15 | 270 | 500 | 770 | 390 | Example |
| 36 | A | 65 | 870 | 15 | 300 | 40 | 780 | 360 | Example |
| 37 | A | 40 | 900 | 15 | 260 | 600 | 770 | 370 | Example |
| 38 | A | 70 | 880 | 15 | 300 | 600 | 780 | 480 | Example |
| 39 | X | 65 | 840 | 15 | 260 | 200 | 770 | 440 | Example |
| 40 | X | 45 | 870 | 15 | 330 | 200 | 760 | 460 | Example |
| 41 | Y | 65 | 870 | 15 | 310 | 200 | 750 | 380 | Example |
| 42 | Y | 45 | 890 | 15 | 270 | 200 | 740 | 390 | Example |
| 43 | Z | 65 | 830 | 15 | 270 | 160 | 800 | 450 | Example |
| 44 | Z | 55 | 870 | 15 | 340 | 160 | 780 | 490 | Example |
| 45 | Z | 35 | 890 | 15 | 280 | 160 | 770 | 400 | Example |
| 46 | AA | 70 | 870 | 15 | 280 | 160 | 770 | 390 | Example |
| 47 | AA | 45 | 890 | 15 | 320 | 160 | 760 | 340 | Example |
| 48 | AA | 55 | 830 | 15 | 340 | 160 | 780 | 310 | Example |
| 49 | AB | 45 | 910 | 15 | 320 | 130 | 770 | 420 | Example |
| 50 | AC | 60 | 860 | 15 | 340 | 130 | 760 | 440 | Example |
| 51 | AD | 50 | 900 | 15 | 340 | 130 | 800 | 320 | Example |
| 52 | AE | 35 | 830 | 15 | 300 | 130 | 720 | 380 | Example |
| 53 | AF | 40 | 870 | 15 | 330 | 130 | 810 | 330 | Example |
| 54 | AG | 70 | 850 | 15 | 290 | 200 | 760 | 380 | Example |

TABLE 4

| No. | Type of steel | Ferrite + bainitic ferrite Area fraction [%] | Martensite Area fraction [%] | Retained austenite Area fraction [%] | Other structure | *1 Area fraction [%] | *2 Area fraction [%] | TS [MPa] | El [%] | Average λ [%] | Defect rate in hole expanding test [%] | Type of cold rolled steel sheet | Remarks |
|---|---|---|---|---|---|---|---|---|---|---|---|---|---|
| 1 | A | 56 | 21 | 23 | — | 87 | 88 | 1072 | 33 | 29 | 0 | CR | E |
| 2 | B | 34 | 36 | 30 | — | 93 | 79 | 1255 | 26 | 23 | 0 | CR | E |
| 3 | C | 32 | 29 | 39 | — | 97 | 81 | 1197 | 28 | 24 | 0 | GI | E |
| 4 | D | 65 | 16 | 19 | — | 88 | 73 | 1042 | 35 | 30 | 0 | GA | E |
| 5 | E | 74 | 13 | 13 | — | 77 | 86 | 992 | 35 | 31 | 2 | GA | E |
| 6 | F | 36 | 31 | 33 | — | 90 | 76 | 1232 | 26 | 23 | 1 | CR | E |
| 7 | G | 74 | 10 | 16 | — | 78 | 74 | 999 | 35 | 33 | 2 | CR | E |
| 8 | H | 37 | 28 | 35 | — | 83 | 58 | 1165 | 27 | 23 | 3 | EG | E |
| 9 | I | 70 | 11 | 19 | — | 96 | 82 | 994 | 39 | 30 | 1 | GA | E |
| 10 | J | 51 | 22 | 27 | — | 81 | 71 | 1119 | 29 | 24 | 1 | CR | E |
| 11 | K | 37 | 33 | 30 | — | 89 | 72 | 1251 | 25 | 23 | 0 | GI | E |
| 12 | L | 68 | 14 | 18 | — | 80 | 73 | 1033 | 34 | 28 | 1 | GA | E |
| 13 | M | 30 | 34 | 36 | — | 90 | 57 | 1267 | 24 | 19 | 3 | CR | E |
| 14 | N | 52 | 25 | 23 | — | 84 | 68 | 1126 | 30 | 27 | 1 | CR | E |
| 15 | O | 68 | 12 | 20 | — | 88 | 89 | 989 | 38 | 34 | 0 | GI | E |
| 16 | P | 49 | 23 | 28 | — | 92 | 69 | 1144 | 30 | 24 | 0 | GA | E |
| 17 | Q | 30 | 36 | 34 | — | 76 | 72 | 1279 | 22 | 22 | 3 | GA | E |
| 18 | <u>R</u> | <u>84</u> | 13 | <u>3</u> | — | 99 | 60 | 887 | <u>23</u> | 32 | 2 | CR | CE |
| 19 | <u>S</u> | <u>22</u> | 52 | 26 | — | 81 | 63 | 1268 | <u>16</u> | <u>13</u> | 2 | CR | CE |
| 20 | <u>T</u> | 62 | 24 | <u>8</u> | Pearlite | 83 | 88 | 1137 | <u>19</u> | 26 | 1 | GA | CE |
| 21 | <u>U</u> | 43 | 28 | 29 | — | 77 | 84 | 1170 | <u>13</u> | 24 | 3 | GI | CE |
| 22 | <u>V</u> | 79 | <u>0</u> | <u>0</u> | Pearlite | 92 | 81 | <u>661</u> | 35 | 37 | 0 | GA | CE |
| 23 | <u>W</u> | 36 | 53 | 11 | — | 80 | 78 | 1246 | <u>16</u> | <u>11</u> | 0 | EG | CE |
| 24 | A | 52 | 22 | 26 | — | <u>67</u> | 84 | 1121 | <u>19</u> | 28 | <u>6</u> | CR | CE |
| 25 | A | 57 | 19 | 24 | — | <u>62</u> | 74 | 1064 | <u>13</u> | 29 | <u>7</u> | CR | CE |
| 26 | A | 58 | 18 | 24 | — | <u>71</u> | 77 | 1089 | <u>21</u> | 25 | <u>5</u> | GI | CE |

*1 The percentage of retained austenite having an aspect ratio of 0.5 or less in the whole retained austenite
*2 The percentage of retained austenite present at a Bain group boundary in the retained austenite having an aspect ratio of 0.5 or less
E: Example
CE: Comparative example

TABLE 5

| No. | Type of steel | Ferrite + bainitic ferrite Area fraction [%] | Martensite Area fraction [%] | Retained austenite Area fraction [%] | Other structure | *1 Area fraction [%] | *2 Area fraction [%] | TS [MPa] | El [%] | Average λ [%] | Defect rate in hole expanding test [%] | Type of cold rolled steel sheet | Remarks |
|---|---|---|---|---|---|---|---|---|---|---|---|---|---|
| 27 | A | 49 | 26 | 25 | — | 69 | 54 | 1136 | 20 | 23 | 5 | CR | CE |
| 28 | A | 63 | 18 | 19 | — | 72 | 84 | 1054 | 18 | 29 | 7 | CR | CE |
| 29 | A | 62 | 18 | 20 | — | 88 | 44 | 1074 | 31 | 29 | 6 | GA | CE |
| 30 | A | 54 | 22 | 24 | — | 65 | 72 | 1091 | 22 | 29 | 7 | CR | CE |
| 31 | A | 87 | 7 | 6 | — | 86 | 86 | 924 | 20 | 37 | 0 | CR | CE |
| 32 | A | 61 | 17 | 22 | — | 66 | 46 | 1059 | 24 | 31 | 11 | GA | CE |
| 33 | A | 39 | 53 | 8 | — | 79 | 75 | 1104 | 22 | 16 | 3 | GA | CE |
| 34 | A | 82 | 8 | 5 | Pearlite | 87 | 63 | 786 | 21 | 37 | 2 | GI | CE |
| 35 | A | 50 | 25 | 25 | — | 91 | 89 | 1147 | 30 | 28 | 1 | CR | E |
| 36 | A | 58 | 19 | 23 | — | 80 | 85 | 1088 | 31 | 27 | 0 | CR | E |
| 37 | A | 54 | 22 | 24 | — | 77 | 76 | 1103 | 29 | 26 | 3 | CR | E |
| 38 | A | 65 | 13 | 22 | — | 91 | 78 | 1060 | 34 | 28 | 0 | GA | E |
| 39 | X | 52 | 18 | 30 | — | 79 | 69 | 1114 | 40 | 23 | 2 | CR | E |
| 40 | X | 64 | 10 | 26 | — | 76 | 60 | 1014 | 48 | 26 | 3 | GA | E |
| 41 | Y | 44 | 34 | 22 | — | 76 | 81 | 1307 | 33 | 19 | 3 | GI | E |
| 42 | Y | 49 | 31 | 20 | — | 86 | 80 | 1268 | 37 | 18 | 0 | CR | E |
| 43 | Z | 60 | 16 | 24 | — | 92 | 84 | 1096 | 26 | 41 | 1 | CR | E |
| 44 | Z | 74 | 9 | 17 | — | 95 | 77 | 1012 | 31 | 40 | 0 | GA | E |
| 45 | Z | 69 | 12 | 19 | — | 78 | 70 | 1042 | 26 | 42 | 2 | GI | E |
| 46 | AA | 60 | 24 | 16 | — | 85 | 86 | 1189 | 21 | 37 | 0 | CR | E |
| 47 | AA | 54 | 28 | 18 | — | 78 | 79 | 1232 | 18 | 36 | 2 | GA | E |
| 48 | AA | 46 | 31 | 23 | — | 86 | 86 | 1271 | 18 | 32 | 1 | GI | E |
| 49 | AB | 65 | 8 | 27 | — | 97 | 86 | 992 | 26 | 45 | 0 | CR | E |
| 50 | AC | 64 | 22 | 14 | — | 78 | 52 | 1165 | 26 | 22 | 4 | EG | E |
| 51 | AD | 79 | 7 | 14 | — | 89 | 79 | 987 | 28 | 32 | 1 | CR | E |
| 52 | AE | 47 | 24 | 29 | — | 92 | 78 | 1184 | 26 | 25 | 0 | GA | E |
| 53 | AF | 54 | 20 | 26 | — | 90 | 67 | 1139 | 26 | 22 | 0 | CR | E |
| 54 | AG | 42 | 32 | 26 | — | 86 | 88 | 1278 | 23 | 16 | 0 | CR | E |

Figure 2:
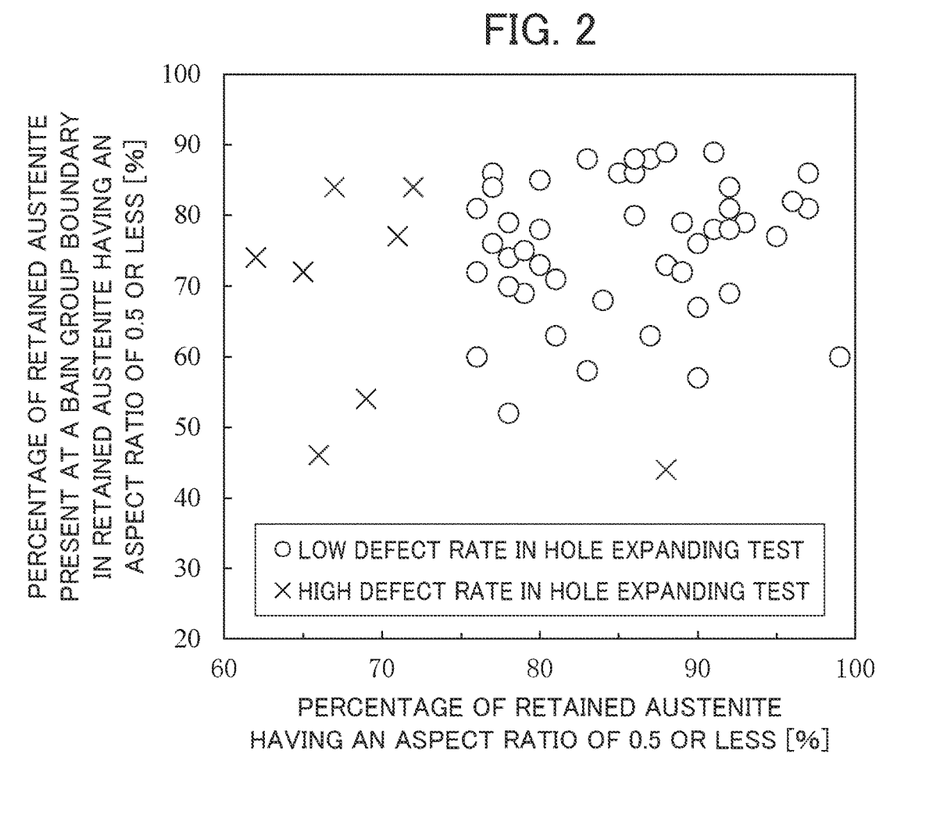
FIG. 2 is a graph showing the influence of the percentage of retained austenite having an aspect ratio of 0.5 or less in the whole retained austenite and the percentage of retained austenite present at a Bain group boundary in the retained austenite having an aspect ratio of 0.5 or less, on the defect rate in a hole expanding test.

*1 The percentage of retained austenite having an aspect ratio of 0.5 or less in the whole retained austenite
*2 The percentage of retained austenite present at a Bain group boundary in the retained austenite having an aspect ratio of 0.5 or less
E: Example
CE: Comparative example FIG. 2 is a graph obtained by plotting part of results shown in Tables 4 and 5. To be more specific, FIG. 2 is a graph showing the influence of the percentage of retained austenite having an aspect ratio of 0.5 or less in the whole retained austenite and the percentage of retained austenite present at a Bain group boundary in the retained austenite having an aspect ratio of 0.5 or less, on the defect rate in the hole expanding test.

As can be seen from the graph of FIG. 2, only when the percentage of retained austenite having an aspect ratio of 0.5 or less was not less than 75% and the percentage of retained austenite present at a Bain group boundary in the retained austenite having an aspect ratio of 0.5 or less was not less than 50%, steel sheets with low defect rates in the hole expanding test were obtained.

As evident from Tables 1 to 5 and FIG. 2, the cold rolled steel sheets of Examples all exhibited not only high strength with tensile strengths (TS) of 980 MPa or more but also good ductility and good stretch flangeability, and furthermore, low defect rates in the hole expanding test.

In contrast, in Comparative Examples, one or more of the foregoing properties were not sufficient.

The invention claimed is:

1. A high strength cold rolled steel sheet having a composition including: by mass,
   C in an amount of more than 0.15% but not more than 0.45%,
   Si in an amount of not less than 0.50% but not more than 2.50%,
   Mn in an amount of not less than 1.50% but not more than 3.00%,
   P in an amount of not more than 0.050%,
   S in an amount of not more than 0.0100%,
   Al in an amount of not less than 0.010% but not more than 0.100%, and
   N in an amount of not less than 0.0005% but not more than 0.0100%, with balance Fe and inevitable impurities,
   wherein in its microstructure, a total area fraction of ferrite and bainitic ferrite is not less than 20% but not more than 80%, an area fraction of retained austenite is more than 10% but not more than 40%, and an area fraction of martensite is more than 0% but not more than 50%,
   a percentage of retained austenite having an aspect ratio of 0.5 or less in whole retained austenite is not less than 75% in area fraction, and
   a percentage of retained austenite present at a Bain group boundary in the retained austenite having an aspect ratio of 0.5 or less is not less than 50% in area fraction,
   wherein the high strength is a tensile strength of 980 MPa or more, and
   when the tensile strength is not less than 980 MPa but less than 1180 MPa, an elongation is 26% or more but 48% or less, and when the tensile strength is not less than 1180 MPa, the elongation is 18% or more but 37% or less.

2. The high strength cold rolled steel sheet according to claim 1, wherein the composition further includes at least one element selected from the group consisting of: by mass,
   Ti in an amount of not less than 0.005% but not more than 0.035%, Nb in an amount of not less than 0.005% but not more than 0.035%, V in an amount of not less than 0.005% but not more than 0.035%, Mo in an amount of not less than 0.005% but not more than 0.035%, B in an amount of not less than 0.0003% but not more than 0.0100%, Cr in an amount of not less than 0.05% but not more than 1.00%, Ni in an amount of not less than 0.05% but not more than 1.00%, Cu in an amount of not less than 0.05% but not more than 1.00%, Sb in an amount of not less than 0.002% but not more than 0.050%, Sn in an amount of not less than 0.002% but not more than 0.050%, Ca in an amount of not less than 0.0005% but not more than 0.0050%, Mg in an amount of not less than 0.0005% but not more than 0.0050%, and REM in an amount of not less than 0.0005% but not more than 0.0050%.

3. The high strength cold rolled steel sheet according to claim 1, wherein C and Mn in the composition satisfy, in percentage by mass, Formula (z): 7.5×C+Mn<5.0 (z).

4. The high strength cold rolled steel sheet according to claim 1, wherein the high strength cold rolled steel sheet has a plating layer on its surface.

5. The high strength cold rolled steel sheet according to claim 2, wherein C and Mn in the composition satisfy, in percentage by mass, Formula (z): 7.5×C+Mn<5.0 (z).

6. The high strength cold rolled steel sheet according to claim 2, wherein the high strength cold rolled steel sheet has a plating layer on its surface.

7. The high strength cold rolled steel sheet according to claim 3, wherein the high strength cold rolled steel sheet has a plating layer on its surface.

8. The high strength cold rolled steel sheet according to claim 5, wherein the high strength cold rolled steel sheet has a plating layer on its surface.

9. A method of manufacturing the high strength cold rolled steel sheet according to claim 1, the method comprising:

a hot rolling step of subjecting a steel material having the composition of claim 7 to hot rolling to thereby obtain a hot rolled steel sheet;

a pickling step of pickling the hot rolled steel sheet;

a cold rolling step of subjecting the hot rolled steel sheet having been pickled to cold rolling at a rolling reduction of not less than 30% to thereby obtain a cold rolled steel sheet;

a first annealing step of heating the cold rolled steel sheet at an annealing temperature $T_1$ of not lower than an $Ac_3$ temperature but not higher than 950° C., subsequently cooling the cold rolled steel sheet from the annealing temperature $T_1$ to a cooling stop temperature $T_2$ of not lower than 250° C. but lower than 350° C. at an average cooling rate of more than 10° C./s, and then retaining the cold rolled steel sheet at the cooling stop temperature $T_2$ for at least 10 s, thereby obtaining a first cold rolled and annealed steel sheet, wherein the $Ac_3$ temperature, in ° C., is determined by the formula $Ac_3=910-203[C]^{1/2}+45[Si]-30[Mn]-20[Cu]-15[Ni]+11[Cr]+32[Mo]+104[V]+400[Ti]+460[Al])$ wherein [C], [Si], [Mn], [Cu], [Ni], [Cr], [Mo], [V], [Ti] and [Al] represent the composition of the respective elements in percentage by mass; and a second annealing step of heating the first cold rolled and annealed steel sheet at an annealing temperature $T_3$ of not lower than 700° C. but not higher than 850° C., and then cooling the first cold rolled and annealed steel sheet from the annealing temperature $T_3$ to a cooling stop temperature $T_4$ of not lower than 300° C. but not higher than 500° C., thereby obtaining a second cold rolled and annealed steel sheet.

10. The method according to claim 9, further comprising a plating step of performing galvanizing treatment, treatment involving galvanizing and alloying, or electrogalvanizing treatment.

11. A method of manufacturing the high strength cold rolled steel sheet according to claim 2, the method comprising:

a hot rolling step of subjecting a steel material having the composition of claim 8 to hot rolling to thereby obtain a hot rolled steel sheet;

a pickling step of pickling the hot rolled steel sheet;

a cold rolling step of subjecting the hot rolled steel sheet having been pickled to cold rolling at a rolling reduction of not less than 30% to thereby obtain a cold rolled steel sheet;

a first annealing step of heating the cold rolled steel sheet at an annealing temperature $T_1$ of not lower than an $Ac_3$ temperature but not higher than 950° C., subsequently cooling the cold rolled steel sheet from the annealing temperature $T_1$ to a cooling stop temperature $T_2$ of not lower than 250° C. but lower than 350° C. at an average cooling rate of more than 10° C./s, and then retaining the cold rolled steel sheet at the cooling stop temperature $T_2$ for at least 10 s, thereby obtaining a first cold rolled and annealed steel sheet, wherein the $Ac_3$ temperature, in ° C., is determined by the formula $Ac_3=910-203[C]^{1/2}+45[Si]-30[Mn]-20[Cu]-15[Ni]+11[Cr]+32[Mo]+104[V]+400[Ti]+460[Al])$ wherein [C], [Si], [Mn], [Cu], [Ni], [Cr], [Mo], [V], [Ti] and [Al] represent the composition of the respective elements in percentage by mass; and a second annealing step of heating the first cold rolled and annealed steel sheet at an annealing temperature $T_3$ of not lower than 700° C. but not higher than 850° C., and then cooling the first cold rolled and annealed steel sheet from the annealing temperature $T_3$ to a cooling stop temperature $T_4$ of not lower than 300° C. but not higher than 500° C., thereby obtaining a second cold rolled and annealed steel sheet.

12. The method according to claim 11, further including a plating step of performing galvanizing treatment, treatment involving galvanizing and alloying, or electrogalvanizing treatment.

13. A method of manufacturing the high strength cold rolled steel sheet according to claim 3, the method comprising:

a hot rolling step of subjecting a steel material having the composition of claim 9 to hot rolling to thereby obtain a hot rolled steel sheet;

a pickling step of pickling the hot rolled steel sheet;

a cold rolling step of subjecting the hot rolled steel sheet having been pickled to cold rolling at a rolling reduction of not less than 30% to thereby obtain a cold rolled steel sheet;

a first annealing step of heating the cold rolled steel sheet at an annealing temperature $T_1$ of not lower than an $Ac_3$ temperature but not higher than 950° C., subsequently cooling the cold rolled steel sheet from the annealing temperature $T_1$ to a cooling stop temperature $T_2$ of not lower than 250° C. but lower than 350° C. at an average cooling rate of more than 10° C./s, and then retaining the cold rolled steel sheet at the cooling stop temperature $T_2$ for at least 10 s, thereby obtaining a first cold rolled and annealed steel sheet, wherein the Ac3 temperature, in ° C., is determined by the formula $Ac_3=910-203[C]^{1/2}+45[Si]-30[Mn]-20[Cu]-15[Ni]+11[Cr]+32[Mo]+104[V]+400[Ti]+460[Al])$ wherein [C], [Si], [Mn], [Cu], [Ni], [Cr], [Mo], [V], [Ti] and [Al] represent the composition of the respective elements in percentage by mass; and a second annealing step of heating the first cold rolled and annealed steel sheet at an annealing temperature $T_3$ of not lower than 700° C. but not higher than 850° C., and then cooling the first cold rolled and annealed steel sheet from the annealing temperature $T_3$ to a cooling stop temperature $T_4$ of not lower than 300° C. but not higher than 500° C., thereby obtaining a second cold rolled and annealed steel sheet.

14. The method according to claim 13, further comprising a plating step of performing galvanizing treatment, treatment involving galvanizing and alloying, or electrogalvanizing treatment.

15. A method of manufacturing the high strength cold rolled steel sheet according to claim 5, the method comprising:

a hot rolling step of subjecting a steel material having the composition of claim 13 to hot rolling to thereby obtain a hot rolled steel sheet;

a pickling step of pickling the hot rolled steel sheet;

a cold rolling step of subjecting the hot rolled steel sheet having been pickled to cold rolling at a rolling reduction of not less than 30% to thereby obtain a cold rolled steel sheet;

a first annealing step of heating the cold rolled steel sheet at an annealing temperature $T_1$ of not lower than an $Ac_3$ temperature but not higher than 950° C., subsequently cooling the cold rolled steel sheet from the annealing temperature $T_1$ to a cooling stop temperature $T_2$ of not lower than 250° C. but lower than 350° C. at an average cooling rate of more than 10° C./s, and then retaining the cold rolled steel sheet at the cooling stop temperature $T_2$ for at least 10 s, thereby obtaining a first cold rolled and annealed steel sheet, wherein the $Ac_3$ temperature, in ° C., is determined by the formula $Ac_3=910-203[C]^{1/2}+45[Si]-30[Mn]-20[Cu]-15[Ni]+11[Cr]+32[Mo]+104[V]+400[Ti]+460[Al])$ wherein [C], [Si], [Mn], [Cu], [Ni], [Cr], [Mo], [V], [Ti] and [Al] represent the composition of the respective elements in percentage by mass; and a second annealing step of heating the first cold rolled and annealed steel sheet at an annealing temperature $T_3$ of not lower than 700° C. but not higher than 850° C., and then cooling the first cold rolled and annealed steel sheet from the annealing temperature $T_3$ to a cooling stop temperature $T_4$ of not lower than 300° C. but not higher than 500° C., thereby obtaining a second cold rolled and annealed steel sheet.

16. The method according to claim 15, further comprising a plating step of performing galvanizing treatment, treatment involving galvanizing and alloying, or electrogalvanizing treatment.

* * * * *